United States Patent [19]
Quinn

[11] 3,766,510
[45] Oct. 16, 1973

[54] VOLTAGE SENSOR AND METHOD OF USING SAME

[75] Inventor: Frederic R. Quinn, Red Hook, N.Y.

[73] Assignee: Zyrotron Industries, Inc., South Hackensack, N.J.

[22] Filed: Dec. 23, 1971

[21] Appl. No.: 211,576

Related U.S. Application Data

[63] Continuation-in-part of Ser. No. 882,549, Dec. 5, 1969, Pat. No. 3,630,971.

[52] U.S. Cl. .................. 338/20, 317/31, 323/8
[51] Int. Cl. .................................. H01c 7/10
[58] Field of Search .................. 338/13, 20, 21; 323/8, 94 R, 81; 317/31; 252/518, 521

[56] References Cited
UNITED STATES PATENTS

| | | | |
|---|---|---|---|
| 2,796,505 | 6/1957 | Bocciarelli | 338/20 |
| 2,747,158 | 5/1956 | LeBel | 323/94 R X |
| 3,187,204 | 6/1965 | Adkins | 323/94 R |
| 3,343,034 | 9/1967 | Ovshinsky | 323/94 R X |
| 2,609,470 | 9/1952 | Quinn | 252/518 X |

*Primary Examiner*—C. L. Albritton
*Attorney*—Roland T. Bryan et al.

[57] ABSTRACT

Metal sulfide compounds and metal phosphate compounds are combined in a selected manner to form a resistance material for a stable sensor having a variable resistance characteristic in response to changes in voltage. One example of the resistance material comprises two or more metal sulphides and one or more metal phosphates.

12 Claims, 4 Drawing Figures

PATENTED OCT 16 1973
3,766,510

VOLTAGE SENSOR AND METHOD OF USING SAME

This application is a continuation-in-part of pending application Ser. No. 882,549, filed Dec. 5, 1969, now U.S. Pat. No. 3,630,971. This invention relates to a new and useful composition of resistance materials. More specifically this invention relates to a sensor responsive to voltage, and specifically to a device for limiting or "clipping" a voltage such as that produced by a power supply.

The sensor of this invention contemplates a material composition which possesses a predictable resistance characteristic when exposed to varying voltages. The material composition is characterized by the presence of metal sulfides and modifiers such as metal phosphates.

In one specific embodiment, the invention comprises the use, as a voltage clipper, of a resistance composition including (1) at least one member of a group of metal sulfides, and (2) at least one member of the group consisting of the phosphates of sodium, calcium, magnesium, zinc, lead and copper.

It is known that metal sulfides when combined in a composition as described in a United States patent to F. R. Quinn, No. 2,609,470, form a sensor whose resistance varies when exposed to varying temperatures. In the vicinity of a critical temperature, $T_c$, a rapid change in sensor resistance is encountered for a relatively small temperature change.

The sensor of this invention may be subjected to a low temperature environment without impairment of its sensing capabilities. High electrical currents may be passed through the sensor without degeneration of its sensing characteristics. Reasonable time constants are obtained to provide a rapidly responding voltage overload sensor. The sensor of this invention further exhibits a significantly low sensitivity to moisture, being essentially non-hygroscopic.

It is, therefore, an object of this invention to provide a resistance composition made of a versatile controllable variable resistance material for sensing voltage.

It is a further object of this invention to provide a method of making a versatile voltage detecting sensor.

These advantages and objects may be further understood from the following description of resistanc compositions and methods of making the sensor in conjunction with the drawing wherein FIG. 1 is an enlarged substantially to scale section view of a sensor;

Figure 1:
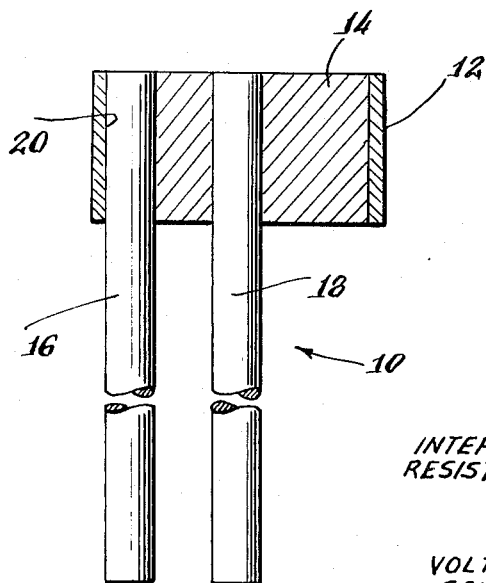

In FIG. 1 a sensor 10 is shown formed with a thin metal shell 12 in the form of a ring. The shell encloses a variable resistance material 14 prepared and formed as will be described. Electrical contact leads 16–18 are embedded in material 14 with lead 16 also in electrical contact with the inner surface 20 of shell 12. Lead 18 is spaced from lead 16 and generally concentric with the ring shell 12.

In a typical sensor, shell 12 has an outside diameter of about 0.202 inch and an axial length of about 0.078 inch. The electrical leads have a diameter of about 0.028 inch and are spaced about 0.080 inch. The low-voltage room-temperature resistance of the sensor as measured across leads 16–18 is from about 8 to 20 megohms.

Figure 3:
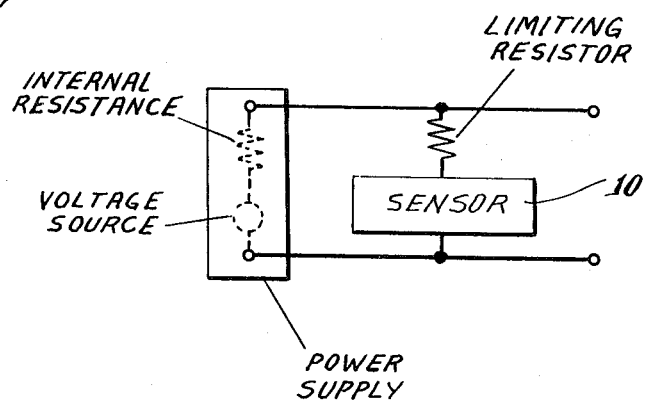
FIG. 3 is a circuit diagram showing a voltage sensor connected to the output terminals of a power supply.
Figure 2:
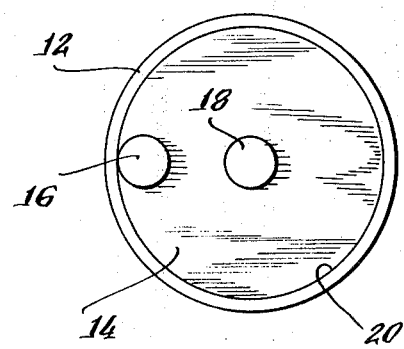
FIG. 2 is an enlarged substantially to scale end view of the sensor of FIG. 1.
Figure 4:
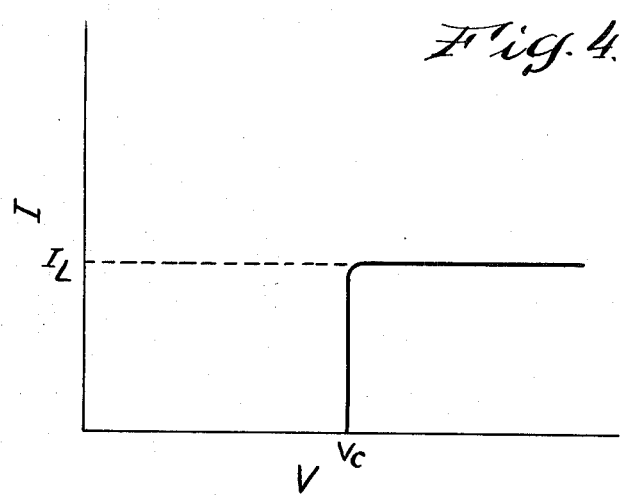
FIG. 4 is a graph of current vs. voltage.

The voltage-resistance (V–R) characteristic curve for a sensor made in accordance with the invention exhibits a change in resistance, R, in the vicinity of a critical break voltage Vc. FIG. 3 shows the sensor connected through a limiting resistor 21 to the output terminals 22, 24 of a conventional electronic power supply 26 (either AC or DC). For illustrative purposes, the power supply is shown as including a voltage source 28 and an internal impedance 30. In some power supplies, the voltage 28 may vary, and may increase to an undesired level where electronic components connected to the output terminals 22, 24 might be damaged, if no over-voltage protection is provided. Such protection is provided by the sensor 10, the resistance of which drops sharply, e.g., to less than one ohm, when the critical voltage $V_c$ is exceeded. Thus, the sensor clips the voltage, to hold it below a dangerous level, due to the low resistance of the sensor at that critical voltage. FIG. 4 shows how the current through the sensor is negligible until $V_c$ is reached, at which point the current can increase sharply, to a level determined by the output voltage, the limiting resistor, and the resistance of the sensor.

The sensor used in this invention includes as constituents a combination of several metal sulfide compounds selected from a group such as sodium sulfide, potassium sulfide, rubidium sulfide, cesium sulfide, copper sulfide, silver sulfide, gold sulfide, magnesium sulfide, calcium sulfide, strontium sulfide, barium sulfide, zinc sulfide, cadmium sulfide, chromium sulfide, antimony sulfide, titanium sulfide, molybdenum sulfide, zirconium sulfide and platinum sulfide.

In addition to the metal sulfide compounds, chemical constituents are employed to provide a medium in which the selected metal sulfides can react together without excessive dissociation as well as to provide solid bulk which is shaped in the desired sensor form. These constituents further influence the desired electrical properties. The chemical constituents include several phosphates selected from a group such as magnesium orthophosphate, calcium orthophosphate, zinc orthophosphate, sodium orthophosphate, lead orthophosphate and copper orthophosphate. Mono and higher basic forms of some of the selected orthophosphates may be included.

Electrical lead contact with the sensor is enhanced by dispersing throughout the sensor a material which has a chemical bonding affinity for the leads. This chemical lead bonding material is chosen for its ability to aid electrical contact of the leads with the sensor throughout diverse environmental conditions. As a result lead separation problems are avoided and a rugged sensor is obtained. In a sensor described herein Nichrome electrical leads (80 percent Ni, 20 percent Cr) are employed and excellent lead contact with the sensor is obtained by dispersing a lead bonding material such as chromium oxide ($Cr_2O_3$) throughout the sensor. Chemical bonding of this lead bonding material to the electrical leads occurs during a sintering step in the manufacture of the sensor.

In the preparation of a sensor of this invention all chemicals are used in the anhydrous powder form. The metal sulfides and phosphates are obtained in fine comminuted form with particle sizes preferably finer than 300 mesh.

In order to assure the anhydrous state of the phosphates they are calcined to drive off moisture. Calcination of the phosphates is accomplished by placing phosphate material in a stainless steel boat of cylindrical shape. Super dry heated nitrogen gas is passed through an end opening of the cylindrical boat to pass in contact with the phosphate material. The dry nitrogen gas is initially heated to a temperature of about 800 F and then brought to a temperature of about 1,800 F which is maintained for about an hour. Thereafter the phosphate material is allowed to cool to about 600 F under the nitrogen atmosphere. After cooling, the phosphate is removed from the boat and stored in a hermetically sealed container.

The resistance composition of this invention is produced from the following ingredients in, for example, the following ranges of approximate parts by weight:

| | Approximate parts by weight |
|---|---|
| cadmium sulfide | 30–60 (preferably 40–50) |
| one or more other metal sulfides | 20–85 |
| at least one or more of the phosphates of sodium, calcium, magnesium, zinc, copper and lead | 100–300 |
| Optional | |
| an oxide of a metal employed in electrical leads attached to a sensor formed of the resistance composition of this invention | Up to 15 |

The phosphates have been found useful when present from about 30 percent to about 65 percent by weight of the powder mix. A preferred composition utilizes phosphates of about 55 percent by weight.

Illustrative examples of the phosphates of the aforementioned metals that are useful in making the resistance material of this invention are sodium orthophosphate, $NaHPO_4$ (mono-H); calcium orthophosphate $CA_3PO_4$ (tri-); magnesium orthophosphate $Mg_3(PO_4)_2$ and $MgHPO_4$ (mono-H); zinc orthophosphate, $Zn_3(PO_4)_2$; copper orthophosphate $Cu_3(PO_4)_2$; and lead orthophosphate $Pb_3(PO_4)_2$.

The particle size of the ingredients mentioned before generally is of very fine mesh, 300 mesh being preferred and are either initially anhydrous or rendered so prior to admixing of the ingredients.

The finely divided or comminuted ingredients are thoroughly mixed in a blender and the resultant loose mixture heated in a neutral atmosphere such as nitrogen at a temperature and for a time period sufficient to form a sintered mass. The maximum temperature for this heating is controlled generally to within the range of from about 1,400° F to about 1,600° F for a time period depending upon the sintering temperature of the particular ingredients employed, their particle size and other influencing factors. Typically an hour at the sintering temperature may be sufficient while an additional time period is consumed to raise the temperature from 800 F to the maximum temperature.

At the end of the described sintering, the admixture has a sintered cake-like form. This cake-like product is then pulverized to a comminuted powdered form of preferably finer than 300 mesh particle size.

Following this pulverizing the admixture is placed in a suitable mold such as a steel die together with electrical leads of selected composition. The electrical leads and admixture are then compressed at very high pressures generally of the order of 5,000 pounds per square inch or more into the desired final shape of the sensor.

The compressed mass is then again sintered in an oxygen-free environment such as nitrogen. This last sintering step involves heating of the compressed specimen to a temperature in the range of from about 1,200° F to about 1,500° F for a time period sufficient to sinter the specimen. Time periods of about one hour as described in the following examples have been found useful.

Following this last heat treatment the sensor was subjected to an electrical stabilizing treatment.

EXAMPLE 1

A sensor was formed by collecting several anydrous fine powder sulfides, phosphates and chromium oxide in a batch. Specifically 30 grams of silver sulfide, 10 grams of molybdenum sulfide, 44 grams of cadmium sulfide, 122 grams of several phosphates and 7 grams of chromium oxide were placed in a blender. The 122 grams of anhydrous phosphate material were formed of 30 grams of sodium orthophosphate (mono basic), 22 grams of calcium orthophosphate, 35 grams of magnesium orthophosphate and 35 grams of magnesium orthophosphate (mono basic). The materials in the blender were then thoroughly mixed.

After blending the loose mixture was placed in a stainless steel boat and heated in a nitrogen atmosphere to a temperature of about 1,460° F and for about an hour. During this heating step further calcination for moisture removal occurs and the mixture is slightly caked and sintered.

The sintered mass was then again placed in a blender and broken up into particle sizes preferably smaller than about 300 mesh to form a powder mix as the basis for the sensor.

The powder mix was then placed in a stainless steel shell of thin sheet stock. This shell serves as an outside surface of the sensor. The shell and powder mix were then placed in a die for powder compression. Nickel-chromium electrical wire leads (0.028 inch diameter) were embedded in the powder mix with approximately 0.090 inch spacing to a depth from about 0.1 to about 0.125 inches. The entire die was then pressurized in a hydraulic press to compress the powder with the lead wires into the desired compact shape.

The compressed mix was thereupon heated in a nitrogen atmosphere to a temperature of 1,260° F for one hour to sinter the compressed mix.

After sintering of the compressed mix the sensor was subjected to an electrical treatment to stabilize the sensor. This treatment involved passing an AC current of about 20 milliamperes at 20 volts for about 15 minutes to complete the sensor.

EXAMPLE 2

Another sensor was prepared with the same composition constituents as in the first example but with the calcium phosphate replaced with zinc phosphate. This sensor was prepared by mixing anhydrous components as follows: 30 grams of sodium orthophosphate (mono basic) 28 grams of silver sulfide, 28 grams of zinc or the phosphate, 15 grams of molybdenum sulfide, 30 grams of magnesium orthophosphate (mono basic), 30 grams of magnesium orthophosphate, 8 grams of chromium oxide, and 24 grams of cadmium sulfide. This mixture was blended and prepared as described in Example 1.

EXAMPLE 3

A composition utilizing the same constituents in the same amount of Example 1 was formed but with both magnesium orthophosphates in reduced amounts of 17.5 grams each and the cadmium sulfide reduced to 24 grams. The mixture was prepared as described in Example 1.

EXAMPLE 4

A composition having the composition of Example 1 with 30 grams of silver sulfide substituted by 30 grams of barium sulfide was prepared in the same manner as described in Example 1.

EXAMPLE 5

A composition similar to the composition of Example 1 with 30 grams of silver sulfide substituted by 30 grams of platinum sulfide was prepared in the same manner as described in Example 1.

EXAMPLE 6

A composition similar to that of Example 1 with 30 grams of silver sulfide substituted by 30 grams of copper sulfide was prepared in the same manner as in Example 1.

EXAMPLE 7

A composition similar to that of Example 1 with 30 grams of silver sulfide substituted by 30 grams of antimony sulfide was prepared in the manner of Example 1.

EXAMPLE 8

A composition similar to that of Example 1 with the 30 grams of silver sulfide deleted was prepared in the same manner as in Example 1.

Individual constituents of the composition as described in the first example may be varied. Such variation is listed below in weight percentages for individual anhydrous constituents while the other constituents are present generally in the amounts as indicated in the first example.

| | |
|---|---|
| cadmium sulfide | from about 9% to about 65% by weight |
| molybdenum sulfide | from about 4% to about 10% by weight |
| silver sulfide | from about 6% to about 40% by weight |
| sodium orthophosphate (mono or di basic) | from about 6% to about 36% by weight |
| calcium orthophosphate | from about 6% to about 40% by weight |
| magnesium orthophosphate (mono basic) | from about 5% to about 40% by weight |
| magnesium orthophosphate | from about 5% to about 40% by weight |

It is preferred that the compositions are prepared with the cadmium sulfide in a weight balance with silver sulfide or any of the latter's substitutes. Such weight balance is preferably from about 1:1 to about 2:1 of cadmium sulfide to the other metal sulfide.

EXAMPLE 9

In another sensor prepared with materials 300 mesh or better, perfectly dry, the following constituents were used: 20 to 25 grams of tricalcium phosphate, 10 to 12 grams of molbdenum (metal), 1 gram of molybdenum di-sulfide, 40 grams of silver sulfide, and 4 grams of chromic oxide. This material was mixed in a blender after which it was mixed in a pulverizer for about 1 hour. It was then put in a nitrogen atmosphere in a high temperature furnace and sintered for 2 hours at a temperature from 1,500° – 1,600° F, after which it was removed from the furnace and run through a crusher so that it is still of 300 mesh. The material was then made into a pellet as shown in the drawings, containing two leads that have been prepared as described. The pellet was then placed in a nitrogen furnace at temperature up to about 1,300° to 1,360° F for 1 hour, then removed from the furnace, cooled down and tested. The resistance at room temperature was between 8 and 20 megohms. It was tested with a circuit having an AC supply voltage and a fixed limiting resistor in series with the element to limit the current. An ammeter and a voltmeter were connected to the sensor to measure the current and voltage. The voltage source was gradually increased and the current read at the same time. Up until 35 volts there was zero current flowing in the circuit. At 35 volts or slightly above, the current suddenly increased to a maximum value at which point the sensor element had a resistance of less than 1 ohm. Upon decreasing the voltage, the current decreased, and at 34 volts the current was back to zero.

EXAMPLE 10

A sensor was prepared as in Example 9, using 20 to 25 grams of tricalcium phosphate, 10 grams of molybdenum (metal), 1 gram of molybdenum di-sulfide, 60 – 70 grams of silver sulfide, and 4 grams of chromic oxide. The pellet prepared as described before was connected to the test circuit, and an intital resistance at room temperature of between 8 and 10 meghoms. As the voltage source is increased, the current remains essentially zero until at three volts it increases rapidly, reaching a maximum limited value. Upon decreasing the voltage to 2.8; volts, the current returned to zero.

Other phosphates may be used besides those mentioned in the examples. Copper and lead phosphates have been found useful. The substitution of different metal sulfides has been found to be particularly desirable to produce sensors having different properties.

Material compositions made in accordance with the invention withstand corrosive environments. The moldability of the resistance composition allows a multitude of shapes such as strips, beads, discs and the like, yet with strong lead attachment. Versatility and reliability of a sensor made in accordance with the invention are enhanced. Repeated cycling of environmental conditions such as temperature can be tolerated without weakening of lead attachments.

What is claimed is:

1. The method of limiting the voltage of a power supply or the like, comprising connecting to the output terminals a sensor in the form of a resistance material composition including in compressed sintered form:
    at least two metal sulfides and at least one metal phosphate.

2. The method of claim 1, wherein the metal phosphate is present in the amount of about 30 percent to about 65 percent by weight.

3. The method of claim 2, wherein the metal phosphate is selected from the group consisting of phosphates of sodium, calcium, zinc, magnesium, lead and copper.

4. The method of claim 1, wherein the metal sulfides are selected from the group consisting of sulfides of cadmium, molybdenum, silver, barium, platinum, copper and antimony and wherein the metal phosphates are selected from the group consisting of phosphates of sodium, calcium, zinc, and magnesium.

5. Apparatus comprising a power supply having a pair of output terminals on which the output voltage is produced;
   a sensor exhibiting a variable voltage resistance characteristic across a pair of electrical 'eads of preselected metallic composition including in compressed sintered form:
   at least four metal sulfides;
   at least one metal phosphate and an oxide of a metal present in the electrical leads; and
   means connecting said leads to said output terminals.

6. Apparatus as claimed in claim 5, wherein the oxide of the metal is present up to about 5 percent by weight of the starting ingredients of the sensor.

7. Apparatus as claimed in claim 6, wherein the oxide is chromium oxide.

8. Apparatus as claimed in claim 6, wherein the metal phosphate is present between about 30 percent to about 65 percent by weight of the starting sensor ingredients.

9. Apparatus as claimed in claim 8 wherein the metal sulfides consist of cadmium sulfide and at least one metal sulfide selected from the group consisting of sulfides of molybdenum, silver, barium, platinum, copper and antimony.

10. Apparatus as claimed in claim 9, wherein the cadmium sulfide is present in preselected weight balance with the other metal sulfide in the weight ratio range of the starting ingredients of respectively from about 1 to 1 to about 2 to 1.

11. Apparatus as claimed in claim 10 wherein at least one metal phosphate are selected from the group consisting of phosphates of sodium, calcium, zinc, and magnesium.

12. Apparatus as claimed in claim 11 wherein the selected metal phosphates consist of in relative weight proportions of the starting ingredients:
   A. from about 6 to about 36 parts of sodium phosphate;
   B. from about 10 to about 80 parts of magnesium phosphate;
   C. from about 6 to about 40 parts of calcium phosphate.

* * * * *